United States Patent
Liang et al.

(10) Patent No.: US 9,483,082 B2
(45) Date of Patent: Nov. 1, 2016

(54) PORTABLE ELECTRONIC MODULE

(71) Applicant: Wistron Corporation, New Taipei (TW)

(72) Inventors: Chen-Yi Liang, New Taipei (TW); Chun-Chien Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 167 days.

(21) Appl. No.: 14/252,767

(22) Filed: Apr. 14, 2014

(65) Prior Publication Data
US 2015/0146371 A1    May 28, 2015

(30) Foreign Application Priority Data
Nov. 28, 2013 (TW) .............................. 102143528 A

(51) Int. Cl.
| | |
|---|---|
| *H05K 5/00* | (2006.01) |
| *G06F 1/16* | (2006.01) |
| *H01F 7/02* | (2006.01) |
| *A45C 13/10* | (2006.01) |

(52) U.S. Cl.
CPC .......... *G06F 1/1656* (2013.01); *A45C 13/1069* (2013.01); *G06F 1/1632* (2013.01); *G06F 1/1654* (2013.01); *G06F 1/1669* (2013.01); *H01F 7/02* (2013.01); *H01F 7/0252* (2013.01); *Y10T 24/32* (2015.01); *Y10T 292/11* (2015.04)

(58) Field of Classification Search
CPC .... G06F 1/1632; G06F 1/1654; G06F 1/162; G06F 1/1669; G06F 1/1656; Y10T 24/32; Y10T 292/11; H01F 7/04; H01F 7/0252; H01F 7/02; E05C 19/16; A45C 13/1069
USPC ............ 361/679.01, 679.29, 679.43, 679.55, 361/679.58, 731, 679.09, 679.17, 679.41; 248/206.5; 292/251.5; 345/111; 335/207, 219, 302; 220/223, 230, 483
See application file for complete search history.

(56) References Cited

U.S. PATENT DOCUMENTS

| | | | |
|---|---|---|---|
| 6,870,732 B2* | 3/2005 | Huang et al. ............ | 361/679.17 |
| 8,290,549 B2* | 10/2012 | Reeves ............... | H04M 1/0216 455/575.1 |
| 8,599,542 B1* | 12/2013 | Healey ................. | G06F 1/1626 345/168 |
| 9,161,469 B2* | 10/2015 | Han ........................ | H05K 7/00 |
| 2004/0174670 A1* | 9/2004 | Huang ................. | G06F 1/1626 361/679.17 |
| 2004/0190239 A1* | 9/2004 | Weng .................... | G06F 1/1616 361/679.2 |
| 2007/0247800 A1 | 10/2007 | Smith | |
| 2010/0081377 A1* | 4/2010 | Chatterjee ............ | G06F 1/1632 455/41.1 |

* cited by examiner

*Primary Examiner* — James Wu
(74) *Attorney, Agent, or Firm* — Winston Hsu; Scott Margo

(57) ABSTRACT

A portable electronic module includes a portable electronic device having a back cover and a front frame, a magnet mechanism, and a support base including a support case and a third magnet. The magnet mechanism includes first and second magnets and a containing case disposed in the portable electronic device and having first and second openings. The first magnet is disposed on the containing case and protrudes from the first opening to abut against or pass through the front frame. The second magnet is disposed on the containing case, repels the first magnet, and protrudes from the second opening to abut against or pass through the back cover. The third magnet is disposed on the support case for attracting the first magnet to make the front frame absorbed onto the support case and for attracting the second magnet to make the back cover absorbed onto the support case.

14 Claims, 9 Drawing Sheets

PORTABLE ELECTRONIC MODULE

BACKGROUND OF THE INVENTION

1. Field of the Invention

The present invention relates to a portable electronic module, and more specifically, to a portable electronic module utilizing a magnetic attraction force to make a portable electronic device absorbed onto a support base.

2. Description of the Prior Art

In general, if a user wants to utilize a portable electronic device (e.g. a tablet computer) as a desktop computer or a notebook for using over a long time, a conventional method commonly seen in the prior art is to additionally utilize a docket station to make the portable electronic device mounted on the docket station obliquely so that the user could operate an input device on the docket station to perform input operations of the portable electronic device. Furthermore, the portable electronic device could also be placed on the docket station so that the user could carry it conveniently.

In practical application, for preventing the portable electronic device placed on the docket station from sliding relative to the docket station, a conventional design for fixing the portable electronic device on the docket station is to dispose magnets on the portable electronic device and the docket station respectively in a magnetic attraction arrangement, so that the portable electronic device could be absorbed onto the docket station by magnetic attraction forces between the magnets. However, the aforesaid design may cause the problem that the portable electronic device could not be absorbed onto the docket station due to magnetic repulsion forces between the magnets occurring when the user places the portable electronic device on the docket station in a free arrangement. In other words, the aforesaid design needs the user to place the portable electronic device on the docket station in a specific arrangement for ensuring that the magnets disposed on the portable electronic device on the docket station could attract each other. In such a manner, the aforesaid design may cause the user much inconvenience in placing the portable electronic device on the docket station.

SUMMARY OF THE INVENTION

An objective of the present invention is to provide a portable electronic module utilizing a magnetic attraction force to make a portable electronic device absorbed onto a support base, to solve the aforesaid problem.

The present invention provides a portable electronic module including a portable electronic device, at least one magnet mechanism, and a support base. The portable electronic device includes a back cover, a device body, and a front frame. The device body is disposed on the back cover. The front frame is connected to the back cover for containing the device body cooperatively with the back cover. The at least one magnet mechanism is disposed on at least one side of the portable electronic device. The at least one magnet mechanism includes a containing case, at least one first magnet, and at least one second magnet. The containing case is disposed in the portable electronic device corresponding to the front frame. The containing case has a first opening facing the front frame and a second opening facing the back cover. The at least one first magnet is disposed on the containing case and protrudes from the first opening to abut against or pass through the front frame. The at least one second magnet is disposed on the containing case in a magnetic repulsion arrangement with the first magnet and protrudes from the second opening to abut against or pass through the back cover. The support base includes a support case and at least one third magnet. The support case is for placing the portable electronic device. The at least one third magnet is disposed on the support case corresponding the at least one magnet mechanism for attracting the first magnet to make the front frame absorbed on the support case and for attracting the second magnet to make the back cover absorbed on the support case.

According to the claimed invention, the at least one magnet mechanism further includes a first holding sheet and a second holding sheet. The first holding sheet is disposed in the containing case corresponding to the first opening for holding the at least one first magnet to protrude from the first opening. The second holding sheet is disposed in the containing case corresponding to the second opening for holding the at least one second magnet to protrude from the second opening.

According to the claimed invention, at least one first positioning slot is formed on a first side of the containing case, and the first holding sheet is inserted into the at least one first positioning slot for holding the first magnet to protrude from the first opening.

According to the claimed invention, at least one second positioning slot is formed on the first side of the containing case, and the second holding sheet is inserted into the at least one second positioning slot for holding the second magnet to protrude from the second opening.

According to the claimed invention, at least one third positioning slot is formed on a second side of the containing case adjacent to the first side, the at least one first positioning slot is arranged alternately with the at least one third positioning slot, and the first holding sheet is selectively inserted into the at least one first positioning slot or the at least one third positioning slot for adjusting a position of the at least one first magnet relative to the first opening.

According to the claimed invention, at least one fourth positioning slot is formed on the second side of the containing case, the at least one second positioning slot is arranged alternately with the at least one fourth positioning slot, and the second holding sheet is selectively inserted into the at least one second positioning slot or the at least one fourth positioning slot for adjusting a position of the at least one second magnet relative to the second opening.

According to the claimed invention, at least one second positioning slot is formed on a second side of the containing case adjacent to the first side, the at least one first positioning slot is arranged alternately with the at least one second positioning slot, and the first holding sheet is selectively inserted into the at least one first positioning slot or the at least one second positioning slot for adjusting a position of the at least one first magnet relative to the first opening.

According to the claimed invention, the first holding sheet and the second holding sheet are made of magnetic material.

According to the claimed invention, the containing case includes a bottom case portion and a movable case portion. The bottom case portion is disposed between the front frame and the back cover for making the at least one second magnet abut against or pass through the back cover. The at least one side of the bottom case portion has a guide slot formed thereon. The second opening is formed on the bottom case portion. The movable case portion is movably disposed on the bottom case portion and has a hook corresponding to the guide slot. The first opening is formed on the movable case portion. The hook is slidably inserted into the guide slot. The at least one first magnet is pressed by the front frame to drive the hook to slide along the guide slot, so that the movable case portion could move relative to the bottom case portion to make the at least one first magnet abut against or pass through the front frame.

According to the claimed invention, the support base further includes an input device disposed on the support case for performing input operations of the portable electronic device.

According to the claimed invention, an opening is formed on the support case corresponding to the at least one third magnet, and the at least one third magnet is aligned with or protrudes from the opening of the support case.

In summary, the present invention adopts the design in which the first magnet and the second magnet are disposed on the containing case in a magnetic repulsion arrangement to face the front frame and the back cover of the portable electronic device respectively and the third magnet is disposed on the support case in a magnetic attraction arrangement with the first magnet and the second magnet. Accordingly, even if the user does not place the portable electronic device on the support base in a specific arrangement, the portable electronic device could still be absorbed onto the support base. In such a manner, the present invention could effectively solve the prior art problem that the portable electronic device could not be absorbed onto the docket station due to the magnetic repulsion forces between the magnets, so as to greatly improve operational convenience of the portable electronic module in placing the portable electronic device on the support base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
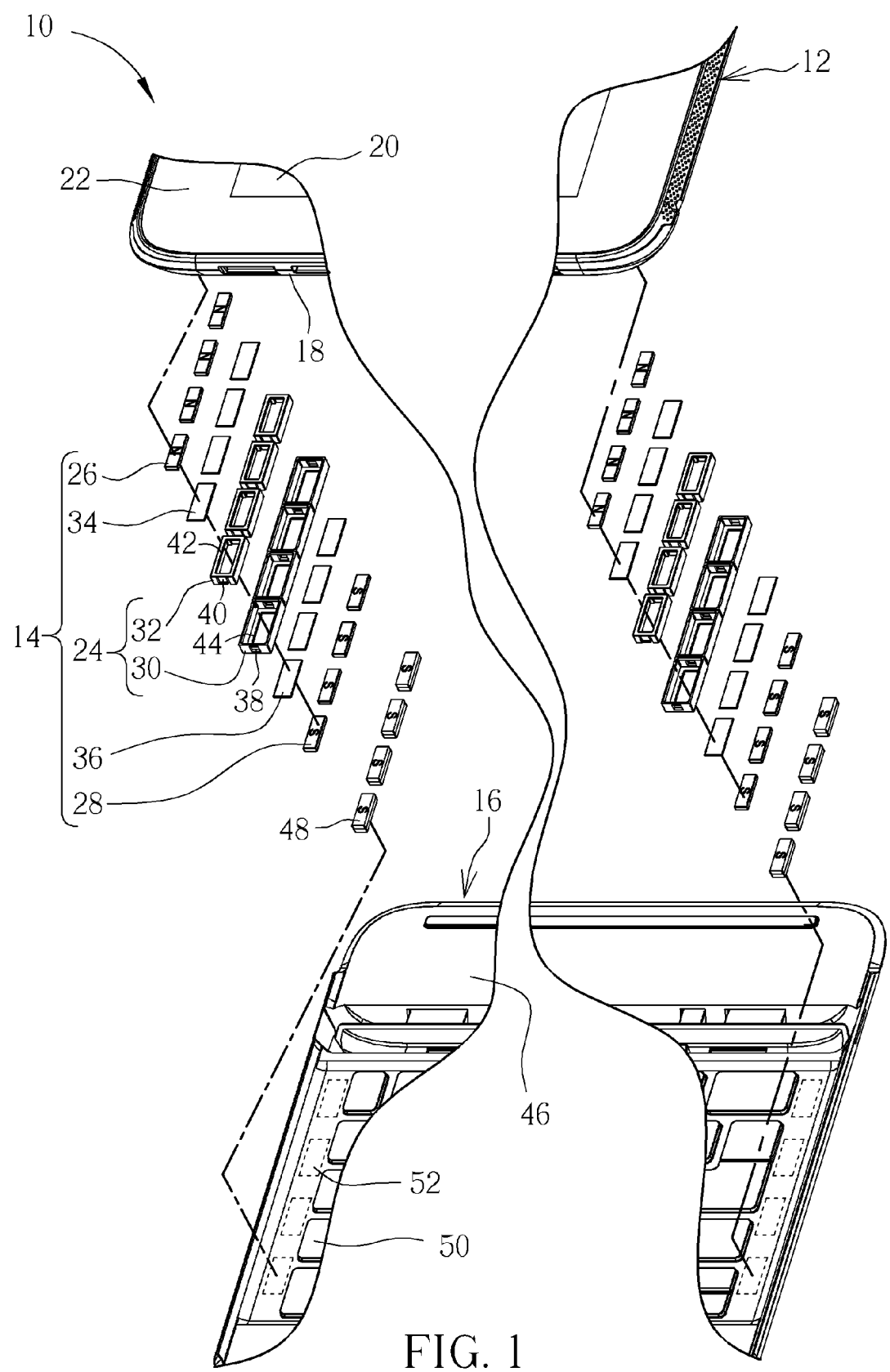
FIG. 1 is an exploded diagram of a portable electronic module according to an embodiment of the present invention.

Please refer to FIG. 1, which is an exploded diagram of a portable electronic module 10 according to an embodiment of the present invention. As shown in FIG. 1, the portable electronic module 10 includes a portable electronic device 12, at least one magnet mechanism 14, and a support base 16. In this embodiment, eight magnet mechanisms 14 are disposed on two sides of the portable electronic device 12 respectively as shown in FIG. 1, but not limited thereto, meaning that they could also be disposed on the other sides of the portable electronic device 12. For clearly showing the design of the magnet mechanism 14, the portable electronic device 12 and the support base 16 are depicted partially in FIG. 1. The portable electronic device 12 could be a tablet computer, but not limited thereto, meaning that the portable electronic device 12 could also be other conventional portable electronic apparatus (e.g. a smart phone). The portable electronic device 12 includes aback cover 18, a device body 20, and a front frame 22. The device body 20 is disposed on the back cover 18 and includes components commonly disposed on a conventional portable electronic device, such as a touch screen, a central processing unit, and a main board. The front frame 22 is connected to the back cover 18 for containing the device body 20 cooperatively with the back cover 18.

Figure 2:
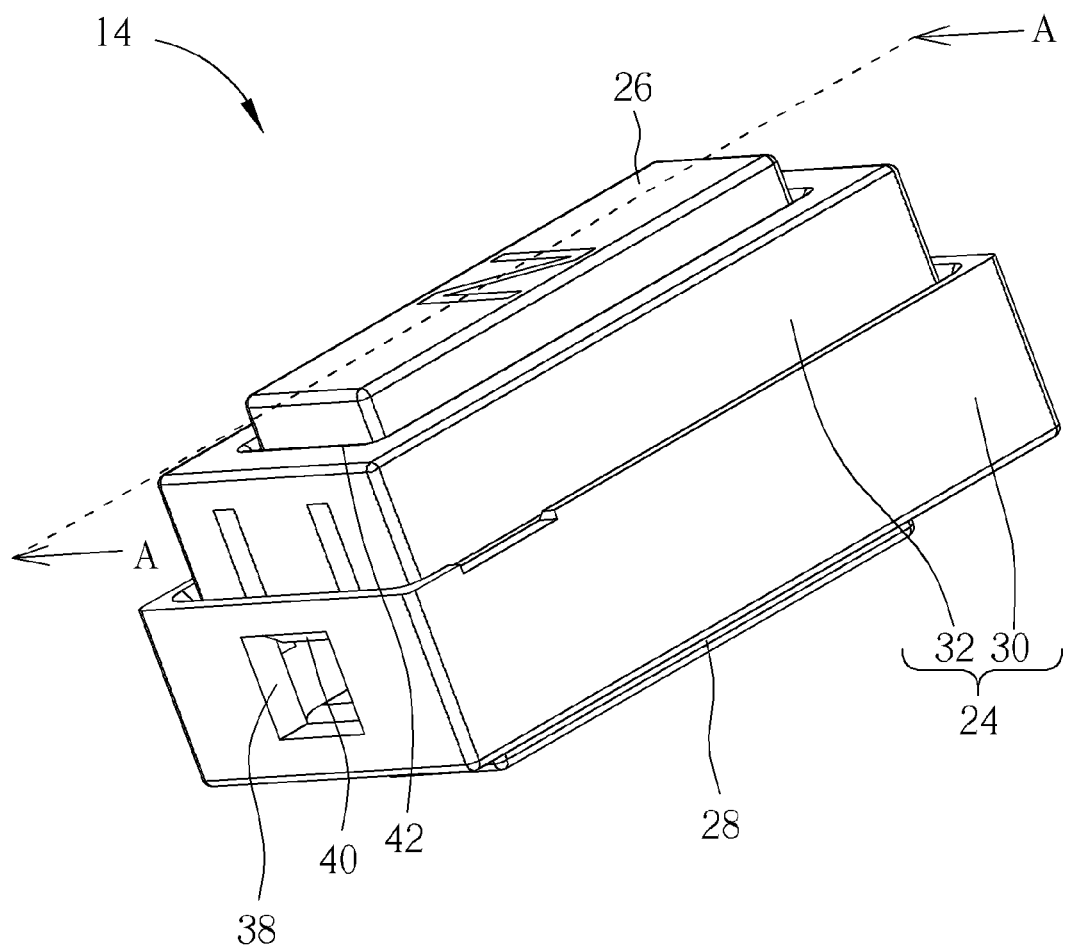
FIG. 2 is an assembly diagram of a magnet mechanism in FIG. 1.
Figure 3:
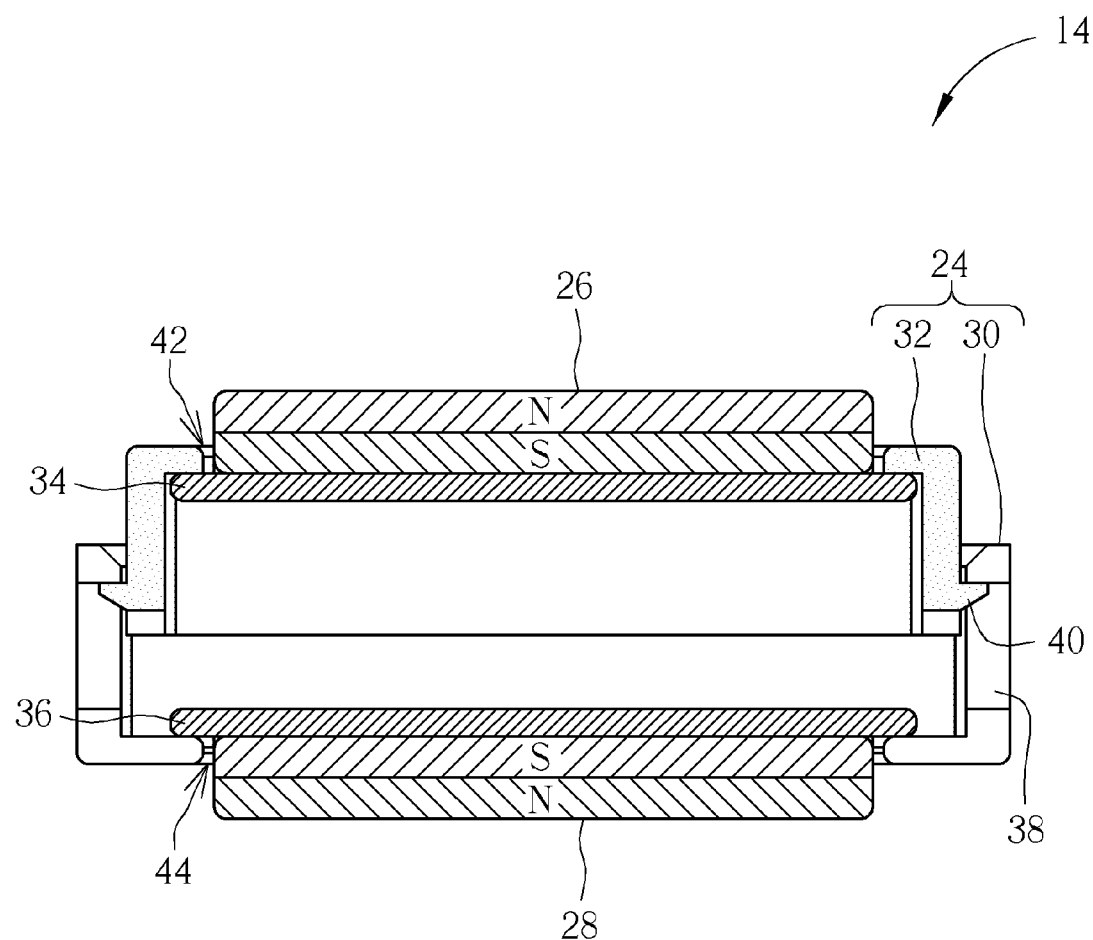
FIG. 3 is a sectional diagram of the mechanism in FIG. 2 along a sectional line A-A.
Figure 4:
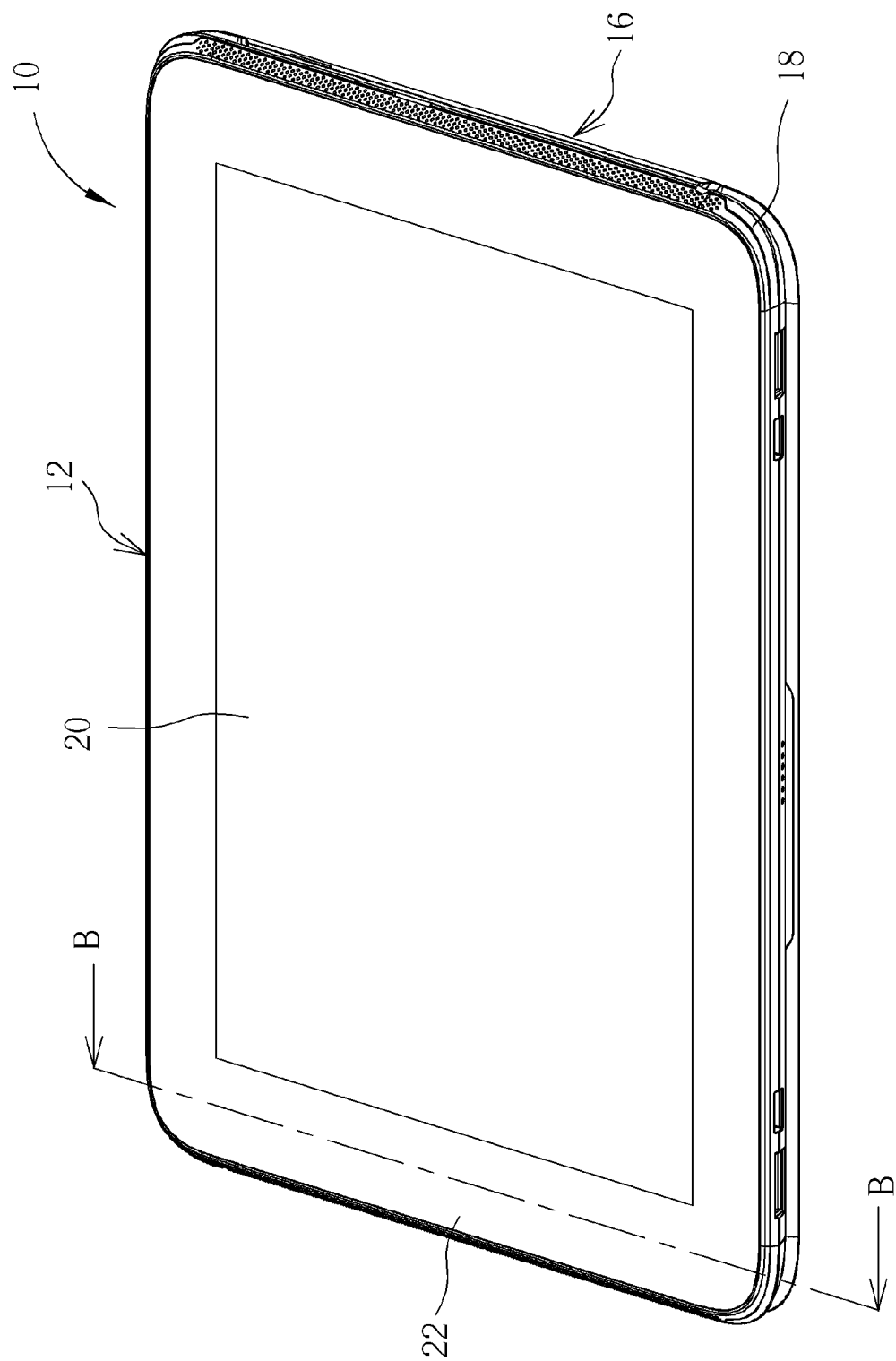
FIG. 4 is an assembly diagram of the portable electronic module when a back cover of a portable electronic device is absorbed onto a support base.
Figure 5:
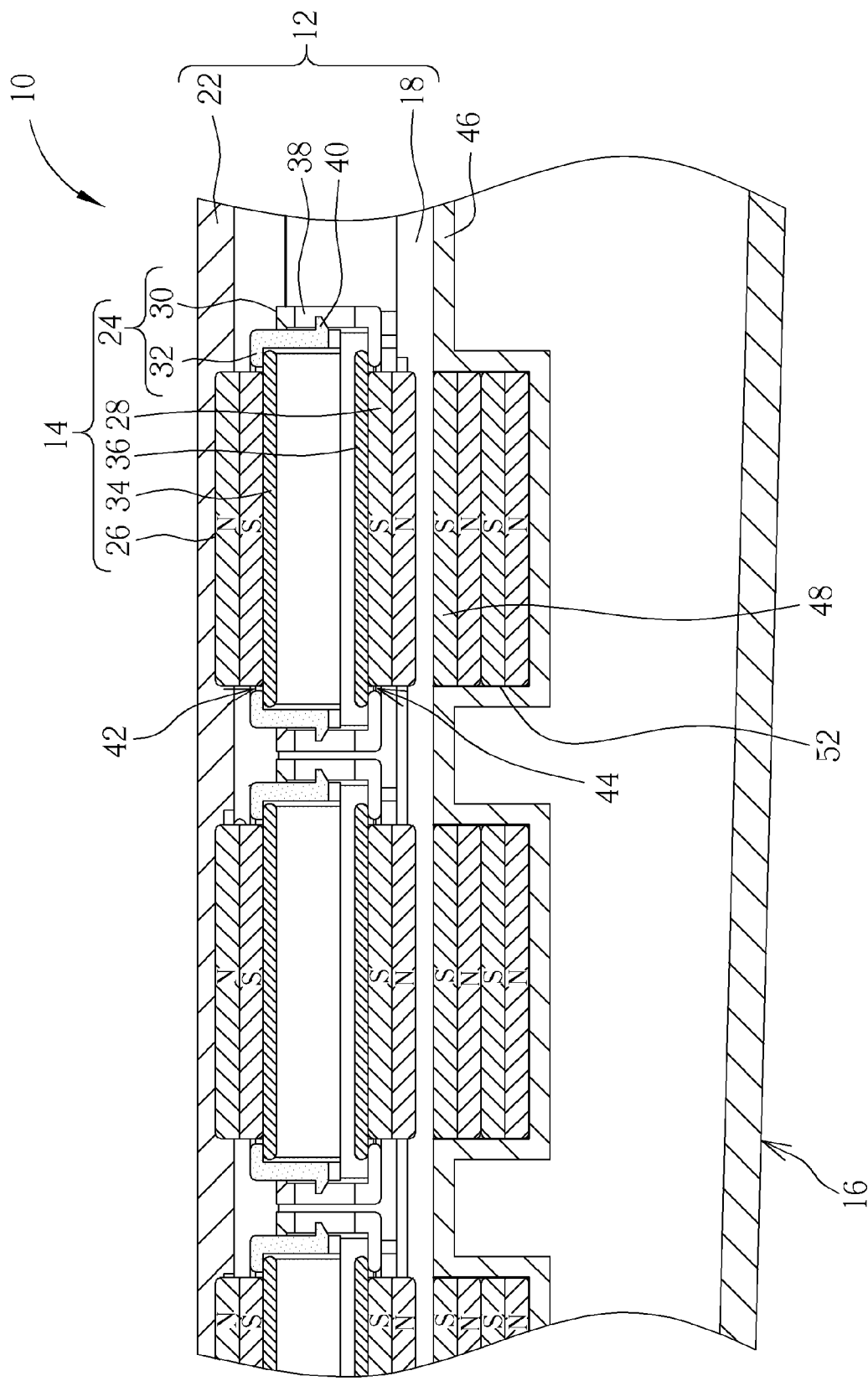
FIG. 5 is a partial sectional diagram of the portable electronic module in FIG. 4 along a sectional line B-B.

More detailed description for the designs of the magnet mechanism 14 and the support base 16 is provided as follows. Please refer to FIG. 1, FIG. 2, FIG. 3, FIG. 4, and FIG. 5. FIG. 2 is an assembly diagram of the magnet mechanism 14 in FIG. 1. FIG. 3 is a sectional diagram of the mechanism 14 in FIG. 2 along a sectional line A-A. FIG. 4 is an assembly diagram of the portable electronic module 10 when the back cover 18 of the portable electronic device 12 is absorbed onto the support base 16. FIG. 5 is a partial sectional diagram of the portable electronic module 10 in FIG. 4 along a sectional line B-B. As shown in FIGS. 1-5, the magnet mechanism 14 includes a containing case 24, at least one first magnet 26 (one shown in FIG. 2, but not limited thereto), and at least one second magnet 28 (one shown in FIG. 2, but not limited thereto). The containing case 24 is disposed in the portable electronic device 12 corresponding to the front frame 22. The first magnet 26 and the second magnet 28 are disposed on the containing case 24 respectively in a magnetic repulsion arrangement (e.g. the S pole of the first magnet 26 facing the S pole of the second magnet 28 as shown in FIG. 3, but not limited thereto).

To be more specific, in this embodiment, the containing case 24 could include a bottom case portion 30 and a movable case portion 32, and the magnet mechanism 14 could further includes a first holding sheet 34 and a second holding sheet 36. The bottom case portion 30 is disposed between the back cover 18 and the front frame 22. Two sides of the bottom case portion 30 could have a guide slot 38 formed thereon respectively (but not limited thereto). The movable case portion 32 is movably disposed on the bottom case portion 30 and has a hook 40 corresponding to the guide slot 38. The hook 40 is slidably inserted into the guide slot 38 (as shown in FIG. 2 and FIG. 3) to make the movable case portion 32 movable upward and downward relative to the bottom case portion 30 via guidance of the hook 40 and the guide slot 38. Furthermore, the movable case portion 32 has a first opening 42 facing the front frame 22, and the bottom case portion 30 has a second opening 44 facing the back cover 18. The first holding sheet 34 is disposed on the movable case portion 32 corresponding to the first opening 42 for holding the first magnet 26 to protrude from the first opening 42. The second holding sheet 36 is disposed on the bottom case portion 30 corresponding to the second opening 44 for holding the second magnet 28 to protrude from the second opening 44.

To be noted, since the magnet mechanism 14 utilizes the magnetic repulsion force between the first magnet 26 and the second magnet 28 to make the movable case portion 32 movably separate from the bottom case portion 30, the distance between the first magnet 26 and the second magnet 28 could vary accordingly when the magnet mechanism is assembled in portable electronic devices with different thicknesses, so that the overall height of the magnet mechanism 14 could be adjusted flexibly to make the magnet mechanism suitable for the portable electronic devices with different thicknesses. For example, as shown in FIG. 5, after the magnet mechanism 14 is assembled in the portable electronic device 12 to make the second magnet 28 abut against the back cover 18, the first magnet 26 is pressed by the front frame 22 so that the distance between the first magnet 26 and the second magnet 28 could be reduced accordingly. In such a manner, the hook 40 could slide along the guide slot 38 to make the movable case portion 32 move to the position as shown in FIG. 5 relative to the bottom case portion 30. On the other hand, if the magnet mechanism 14 is assembled in another portable electronic device with a smaller thickness, the first magnet 26 and the second magnet 28 could be pressed by a case of this portable electronic device to further reduce the distance between the first magnet 26 and the second magnet 28 since this portable electronic device provides less inner space. In such a manner, the hook 40 could slide along the guide slot 38 to make the movable case portion 32 move to the position lower than the position as shown in FIG. 5. Via the aforesaid design in which the overall height of the magnet mechanism 14 is adjustable, the present invention could further improve flexibility of the magnet mechanism 14 in practical use.

As shown in FIG. 1, FIG. 4, and FIG. 5, the support base 16 could include a support case 46 and at least one third magnet 48. In this embodiment, sixteen third magnets 48 are disposed on two sides of the support case 46 respectively as shown in FIG. 1, but not limited thereto, meaning that they could also be disposed on the other sides of the support case 46. The support case 46 could be used for placing the portable electronic device 12 or supporting the portable electronic device 12 to be mounted thereon obliquely. The related description for the support structural design of the support case 46 is commonly seen in the prior art and therefore omitted herein. The third magnet 48 is disposed on the support case 46 corresponding to the magnet mechanism 14 in a magnetic attraction arrangement with the first magnet 26 and the second magnet 28 (e.g. the S pole of the third magnet 48 facing the N pole of the first magnet 26 as shown in FIG. 5). The third magnet 48 is used for attracting the first magnet 26 to make the front frame 22 of the portable electronic device 12 absorbed onto the support case 46 of the support base 16, and is used for attracting the second magnet 28 to make the back cover 18 of the portable electronic device 12 absorbed onto the support case 46 of the support base 16. In this embodiment, the support base 16 could further include an input device 50. The input device 50 could be preferably a keyboard and be disposed on the support case 46 to form a conventional docket station cooperatively with the support case 46. In such a manner, the portable electronic module 10 could allow a user to utilize the input device 50 to perform input operations of the portable electronic device 12 when the portable electronic device 12 is mounted on the support case 46 obliquely. To be noted, in another embodiment, the support base 16 could omit the input device 50 to be a base only having a support function, or could be a portable electronic product.

In practical application, the first holding sheet 34 and the second holding sheet 36 could be preferably made of magnetic material for further improving the magnetic attraction effect between the third magnet 48 and the first magnet 26 and the magnetic attraction effect between the third magnet 48 and the second magnet 28, so that the portable electronic device 12 could be absorbed onto the support base 16 more steadily. Furthermore, as shown in FIG. 1, an opening 52 (briefly depicted by dotted lines in FIG. 1) could be formed on the support case 46 corresponding to the third magnet 48 for containing the third magnet 48, so as to make the third magnet 48 aligned with the opening 52 of the support case 46 as shown in FIG. 5 (but not limited thereto, meaning that the present invention could also adopt the design in which the third magnet 48 protrudes from the opening 52). In such a manner, the distance between the third magnet 48 and the first magnet 26 and the distance between the third magnet 48 and the second magnet 28 could be reduced to further improve the magnet attraction effect between the third magnet 48 and the first magnet 26 and the magnet attraction effect between the third magnet 48 and the second magnet 28. The aforesaid design could also be applied to the first magnet 26 and the second magnet 28. For example, the first magnet 26 could pass through the front frame 22 via an opening on the front frame 22 to be aligned with the opening of the front frame 22, or the second magnet 28 could pass through the back cover 18 via an opening of the back cover 18 to protrude from the opening of the back cover 18. The derivative embodiments could be reasoned by analogy according to the aforesaid description and therefore omitted herein.

Figure 6:
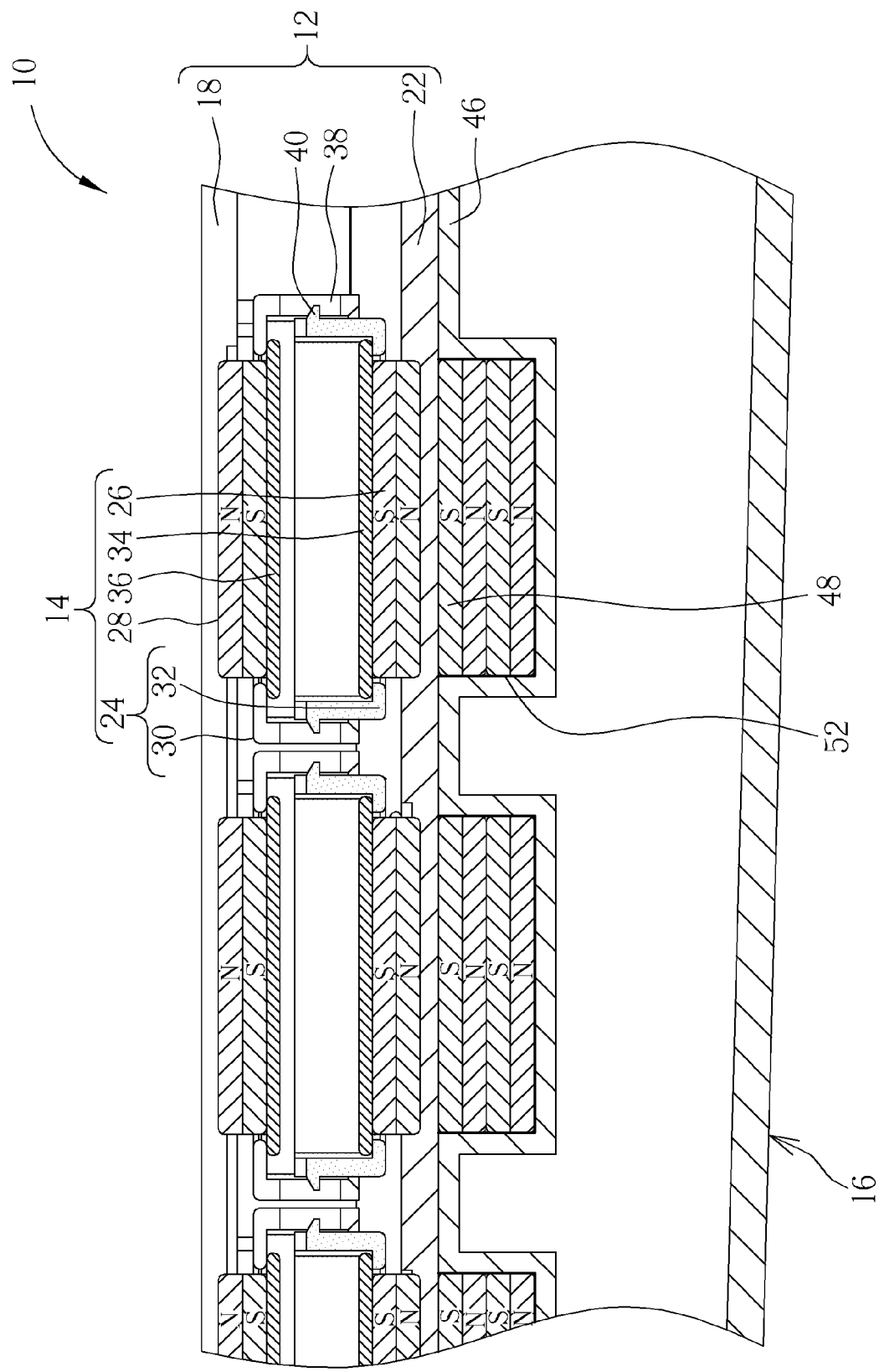
FIG. 6 is a partial sectional diagram of a front frame of the portable electronic device in FIG. 5 being absorbed onto a support case of the support base.

Via the aforesaid design, even if a user does not place the portable electronic device 12 on the support base 16 in a specific arrangement, the portable electronic device 12 could still be absorbed onto the support base 16. For example, if the user places the portable electronic device 12 facing upward (as shown in FIG. 5) on the support base 16, the support base 16 could utilize the third magnets 48 to attract the second magnets 28 by the magnetic attraction forces between the third magnets 48 and the second magnets 28, so that the back cover 18 of the portable electronic device 12 could be absorbed onto the support case 46 of the support base 16 steadily for the user to carry or operate the portable electronic device 12 conveniently (e.g. performing the input operations of the portable electronic device 12). On the other hand, please refer to FIG. 6, which is a partial sectional diagram of the front frame 22 of the portable electronic device 12 in FIG. 5 being absorbed onto the support case 46 of the support base 16. If the user places the portable electronic device 12 facing downward (as shown in FIG. 6) on the support base 16, the support base 16 could utilize the third magnets 48 to attract the first magnets 26 by the magnetic attraction forces between the third magnets 48 and the first magnets 26, so that the front frame 22 of the portable electronic device 12 could be absorbed onto the support case 46 of the support base 16 steadily for the user to carry the portable electronic device 12 conveniently.

Furthermore, if the user rotates the portable electronic device 12 as shown in FIG. 5 by 180' to make the portable electronic device 12 reversely placed on the support base 16, the back cover 18 of the portable electronic device 12 could still be absorbed onto the support case 46 of the support base 16 by the magnetic attraction forces between the third magnets 48 and the second magnets 28. Similarly, if the user rotates the portable electronic device 12 as shown in FIG. 6 by 180 to make the portable electronic device 12 reversely placed on the support base 16, the front frame 22 of the portable electronic device 12 could still be absorbed onto the support case 46 of the support base 16 by the magnetic attraction forces between the third magnets 48 and the first magnets 26.

Figure 7:
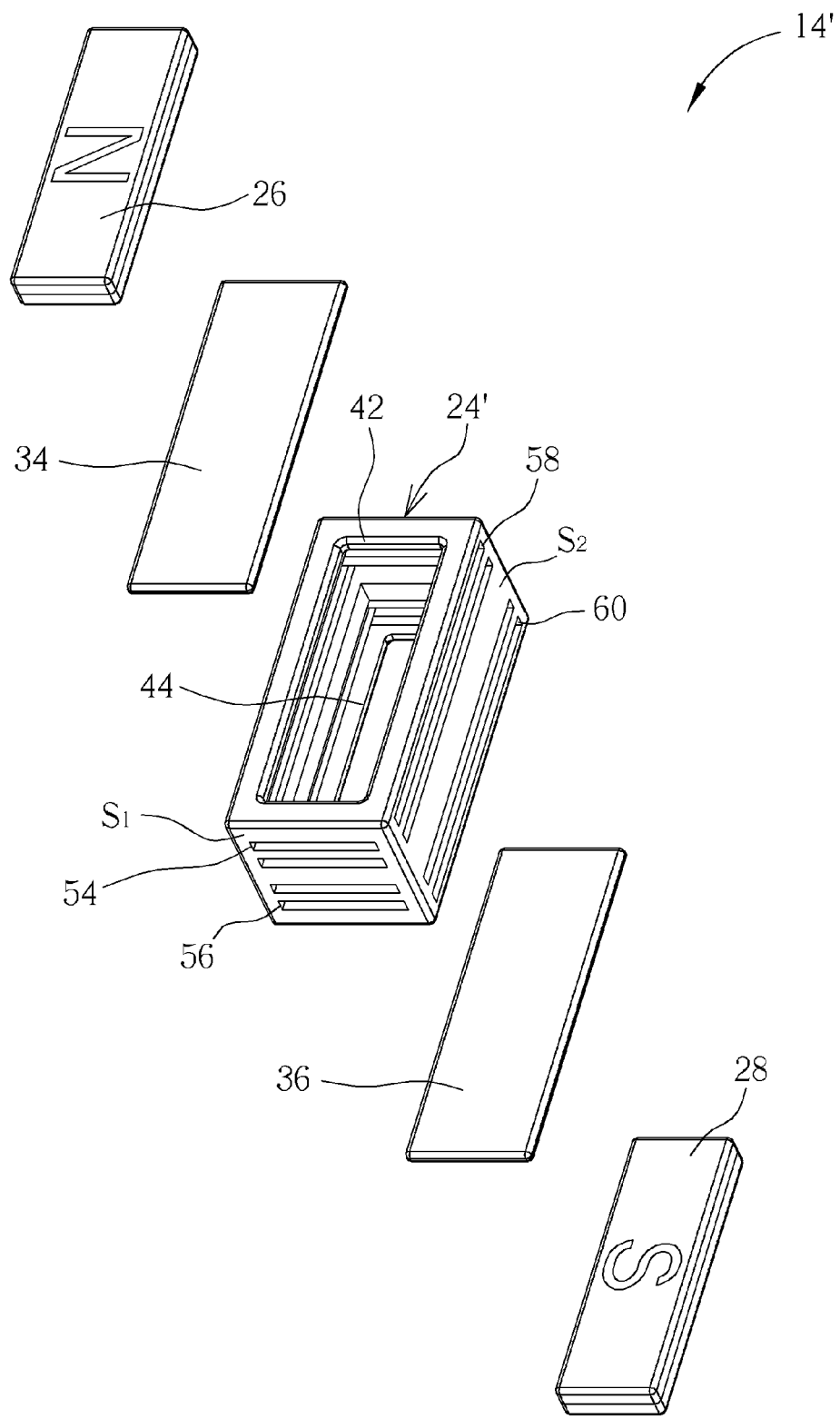
FIG. 7 is an exploded diagram of a magnet mechanism according to another embodiment of the present invention.
Figure 8:
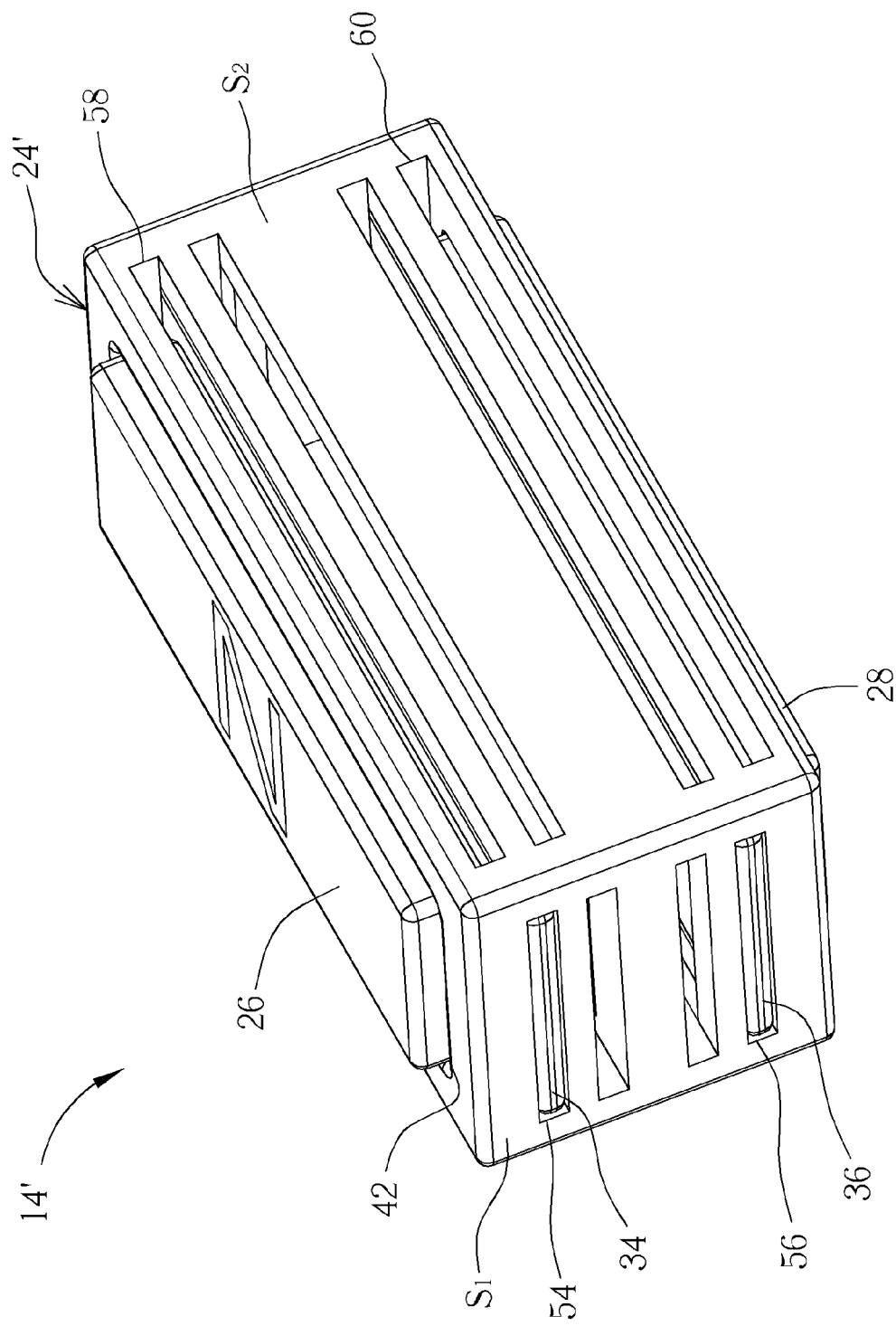
FIG. 8 is an assembly diagram of the magnet mechanism in FIG. 7.
Figure 9:
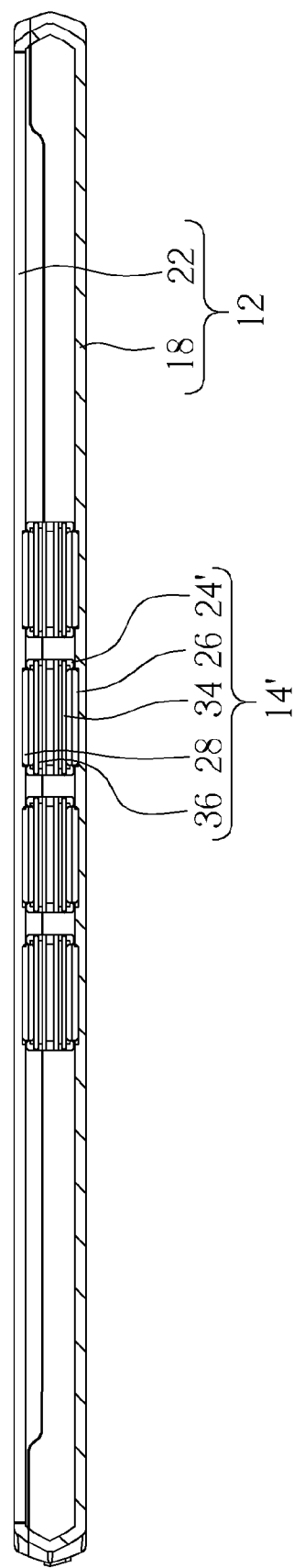
FIG. 9 is a partial sectional diagram of the magnet mechanism in FIG. 8 being disposed in the portable electronic device.

It should be mentioned that the design of the magnet mechanism is not limited to the aforesaid embodiment. That is, the present invention could also adopt the design in which the holding sheets are inserted into different positioning slots of the containing case for adjusting the overall height of the magnet mechanism. For example, please refer to FIG. 7, FIG. 8, and FIG. 9. FIG. 7 is an exploded diagram of a magnet mechanism 14' according to another embodiment of the present invention. FIG. 8 is an assembly diagram of the magnet mechanism 14' in FIG. 7. FIG. 9 is a partial sectional diagram of the magnet mechanism 14' in FIG. 8 being disposed in the portable electronic device 12. Components both mentioned in this embodiment and the aforesaid embodiment represent components with similar functions or structures, and the related description is omitted herein. As shown in FIG. 7 and FIG. 8, the magnet mechanism 14' includes at least one first magnet 26 (two shown in FIG. 7, but not limited thereto), at least one second magnet 28 (two shown in FIG. 7, but not limited thereto), the first holding sheet 34, the second holding sheet 36, and a containing case 24'. In this embodiment, at least one first positioning slot 54 and at least one second positioning slot 56 (two shown in FIG. 7 respectively, but not limited thereto) are formed on a first side $S_1$ of the containing case 24', and at least one third positioning slot 58 and at least one fourth positioning slot 60 (two shown in FIG. 7 respectively, but not limited thereto) are formed on a second side $S_2$ of the containing case 24'. The first positioning slots 54 are arranged alternately with the third positioning slots 58, and the second positioning slots 56 are arranged alternately with the fourth positioning slots 60.

Via the aforesaid design, the first holding sheet 34 could be inserted into the first positioning slot 54 for holding the first magnet 26 to protrude from the first opening 42, and the second holding sheet 36 could be inserted into the second positioning slot 56 for holding the second magnet 28 to protrude from the second opening 44. Accordingly, after the magnet mechanism 14' is disposed in the portable electronic device 12, the first magnet 26 and the second magnet 28 could abut against the front frame 22 and the back cover 18 respectively as shown in FIG. 8. On the other hand, if the magnet mechanism 14' is disposed in another electronic device with a greater thickness, the magnet mechanism 14' could utilize the first holding sheet 34 with a greater width and the second holding sheet 36 with a greater width to insert into the third positioning slot 58 and the fourth positioning slot 60 respectively for adjusting a position of the first magnet 26 relative to the first opening 42 and a position of the second magnet 28 relative to the second opening 44. Accordingly, the first magnet 26 and the second magnet 28 could further protrude from the containing case 24' to abut against the front frame and the back cover of this portable electronic device. As for the related description for the derivative operations of inserting the first holding sheet 34 and the second holding sheet 36 into the other positioning slots respectively to increase or decrease the overall height of the magnet mechanism 14', it could be reasoned by analogy according to the aforesaid description and therefore omitted herein.

In such a manner, the present invention could effectively improve flexibility of the magnet mechanism 14' in practical use. To be noted, in practical application, the magnet mechanism 14' could adopt the design in which only the positioning slots for adjusting the relative position of the first magnet 26 are formed on the containing case 24' so as to simplifying the structural design of the containing case 24'. For example, the containing case 24' could only have the first positioning slots 54 and the third positioning slots 58 formed thereon or could only have the second positioning slots 56 and the fourth positioning slots 60 formed thereon.

Compared with the prior art, the present invention adopts the design in which the first magnet and the second magnet are disposed on the containing case in a magnetic repulsion arrangement to face the front frame and the back cover of the portable electronic device respectively and the third magnet is disposed on the support case in a magnetic attraction arrangement with the first magnet and the second magnet. Accordingly, even if the user does not place the portable electronic device on the support base in a specific arrangement, the portable electronic device could still be absorbed onto the support base. In such a manner, the present invention could effectively solve the prior art problem that the portable electronic device could not be absorbed onto the docket station due to the magnetic repulsion forces between the magnets, so as to greatly improve operational convenience of the portable electronic module in placing the portable electronic device on the support base.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A portable electronic module comprising:
   a portable electronic device comprising:
      a back cover;
      a device body disposed on the back cover; and
      a front frame connected to the back cover for containing the device body cooperatively with the back cover;
   at least one magnet mechanism disposed on at least one side of the portable electronic device, the at least one magnet mechanism comprising:
      a containing case disposed in the portable electronic device corresponding to the front frame, the containing case having a first opening facing the front frame and a second opening facing the back cover, at least one first positioning slot being formed on a first side of the containing case;
      at least one first magnet disposed on the containing case and protruding from the first opening to abut against or pass through the front frame;
      at least one second magnet disposed on the containing case in a magnetic repulsion arrangement with the first magnet and protruding from the second opening to abut against or pass through the back cover; and
      a first holding sheet inserted into the at least one first positioning slot for holding the at least one first magnet to protrude from the first opening; and
   a support base comprising:
      a support case for placing the portable electronic device; and
      at least one third magnet disposed on a top surface of the support case corresponding to the at least one magnet mechanism for attracting the first magnet to make the front frame absorbed on the top surface of the support case and for attracting the second magnet to make the back cover absorbed on the top surface of the support case.
2. The portable electronic module of claim 1, wherein the at least one magnet mechanism further comprises:

a second holding sheet disposed in the containing case corresponding to the second opening for holding the at least one second magnet to protrude from the second opening.

3. The portable electronic module of claim 2, wherein at least one second positioning slot is formed on the first side of the containing case, and the second holding sheet is inserted into the at least one second positioning slot for holding the second magnet to protrude from the second opening.

4. The portable electronic module of claim 3, wherein at least one third positioning slot is formed on a second side of the containing case adjacent to the first side, the at least one first positioning slot is arranged alternately with the at least one third positioning slot, and the first holding sheet is selectively inserted into the at least one first positioning slot or the at least one third positioning slot for adjusting a position of the at least one first magnet relative to the first opening.

5. The portable electronic module of claim 4, wherein at least one fourth positioning slot is formed on the second side of the containing case, the at least one second positioning slot is arranged alternately with the at least one fourth positioning slot, and the second holding sheet is selectively inserted into the at least one second positioning slot or the at least one fourth positioning slot for adjusting a position of the at least one second magnet relative to the second opening.

6. The portable electronic module of claim 1, wherein at least one second positioning slot is formed on a second side of the containing case adjacent to the first side, the at least one first positioning slot is arranged alternately with the at least one second positioning slot, and the first holding sheet is selectively inserted into the at least one first positioning slot or the at least one second positioning slot for adjusting a position of the at least one first magnet relative to the first opening.

7. The portable electronic module of claim 2, wherein the first holding sheet and the second holding sheet are made of magnetic material.

8. The portable electronic module of claim 1, wherein the containing case comprises:
a bottom case portion disposed between the front frame and the back cover for making the at least one second magnet abut against or pass through the back cover, at least one side of the bottom case portion having a guide slot formed thereon, the second opening being formed on the bottom case portion; and
a movable case portion movably disposed on the bottom case portion and having a hook corresponding to the guide slot, the first opening being formed on the movable case portion, the hook being slidably inserted into the guide slot, the at least one first magnet being pressed by the front frame to drive the hook to slide along the guide slot, so that the movable case portion could move relative to the bottom case portion to make the at least one first magnet abut against or pass through the front frame.

9. The portable electronic module of claim 8, wherein the at least one magnet mechanism further comprises:
a second holding sheet disposed in the containing case corresponding to the second opening for holding the at least one second magnet to protrude from the second opening.

10. The portable electronic module of claim 9, wherein the first holding sheet and the second holding sheet are made of magnetic material.

11. The portable electronic module of claim 1, wherein the support base further comprises:
an input device disposed on the support case for performing input operations of the portable electronic device.

12. The portable electronic module of claim 1, wherein an opening is formed on the support case corresponding to the at least one third magnet, and the at least one third magnet is aligned with or protrudes from the opening of the support case.

13. A portable electronic module comprising:
a portable electronic device comprising:
a back cover;
a device body disposed on the back cover; and
a front frame connected to the back cover for containing the device body cooperatively with the back cover;
at least one magnet mechanism disposed on at least one side of the portable electronic device, the at least one magnet mechanism comprising:
a containing case disposed in the portable electronic device corresponding to the front frame, the containing case having a first opening facing the front frame and a second opening facing the back cover, the containing case comprising a bottom case portion and a movable case portion, the bottom case portion being disposed between the front frame and the back cover, at least one side of the bottom case portion having a guide slot formed thereon, the second opening being formed on the bottom case portion, the movable case portion being movably disposed on the bottom case portion and having a hook corresponding to the guide slot, the first opening being formed on the movable case portion, the hook being slidably inserted into the guide slot;
at least one first magnet disposed on the movable case portion and protruding from the first opening, the at least one first magnet being pressed by the front frame to drive the hook to slide along the guide slot, so that the movable case portion could move relative to the bottom case portion to make the at least one first magnet abut against or pass through the front frame; and
at least one second magnet disposed on the bottom case portion in a magnetic repulsion arrangement with the first magnet and protruding from the second opening to abut against or pass through the back cover; and
a support base comprising:
a support case for placing the portable electronic device; and
at least one third magnet disposed on the support case corresponding to the at least one magnet mechanism for attracting the first magnet to make the front frame absorbed on the support case and for attracting the second magnet to make the back cover absorbed on the support case.

14. The portable electronic module of claim 13, wherein the at least one magnet mechanism further comprises:
a first holding sheet disposed in the movable case portion corresponding to the first opening for holding the at least one first magnet to protrude from the first opening; and
a second holding sheet disposed in the bottom case portion corresponding to the second opening for holding the at least one second magnet to protrude from the second opening.

* * * * *